United States Patent [19]
Hamilton

[11] Patent Number: 5,185,592
[45] Date of Patent: Feb. 9, 1993

[54] CONTACT ALARM APPARATUS

[76] Inventor: Kenneth B. Hamilton, 1408 Granville Rd., Westfield, Mass. 01085

[21] Appl. No.: 771,118

[22] Filed: Oct. 4, 1991

[51] Int. Cl.⁵ .............................................. B60Q 1/00
[52] U.S. Cl. ................................ 340/436; 200/61.44; 340/437; 340/942
[58] Field of Search ............... 340/436, 437, 438, 942, 340/933, 901, 903, 932.2, 958; 116/28 R; 200/61.44; 180/274; 293/4, 108, 142

[56] References Cited

U.S. PATENT DOCUMENTS

| | | | |
|---|---|---|---|
| 2,444,635 | 7/1948 | Dennis, Jr. | 340/436 |
| 3,853,199 | 12/1974 | Hirashima et al. | 200/61.44 |
| 4,103,284 | 7/1978 | Blake | 200/61.44 |
| 4,926,170 | 5/1990 | Beggs et al. | 340/903 |
| 4,967,180 | 10/1990 | Wang | 340/436 |
| 5,045,834 | 9/1991 | Hutchcraft | 340/932.2 |

*Primary Examiner*—Jin F. Ng
*Assistant Examiner*—Brent A. Swarthout
*Attorney, Agent, or Firm*—Leon Gilden

[57] ABSTRACT

A first cylinder is orthogonally mounted relative to a vehicular bumper extending exteriorly thereof telescopingly receiving a second cylinder relative to the first cylinder in a coaxially aligned relationship, with the second cylinder extending beyond the first cylinder and arranged for retraction within the first cylinder. A first spring mounted between a rear terminal end of the second cylinder and the first cylinder maintains the second cylinder in an extended orientation. A first sensor mounted within the second cylinder sensitive to a lessening of light directed through the second cylinder is operative to engage an alarm light upon an object becoming in proximation to the forward distal end of the second cylinder. An alarm switch is mounted adjacent a rear terminal end of the first cylinder cooperative with an actuator rod mounted to the second cylinder to further provide actuation of the alarm light. The first light sensor is sensitive to light within a limited range, whereupon diminishing or additional reflected light effects closure of the switch to effect illumination of the alarm light. A second sensor is operative to effect illumination of a bulb within the second cylinder to effect illumination of the bulb during evening hours of lessened available light.

1 Claim, 4 Drawing Sheets

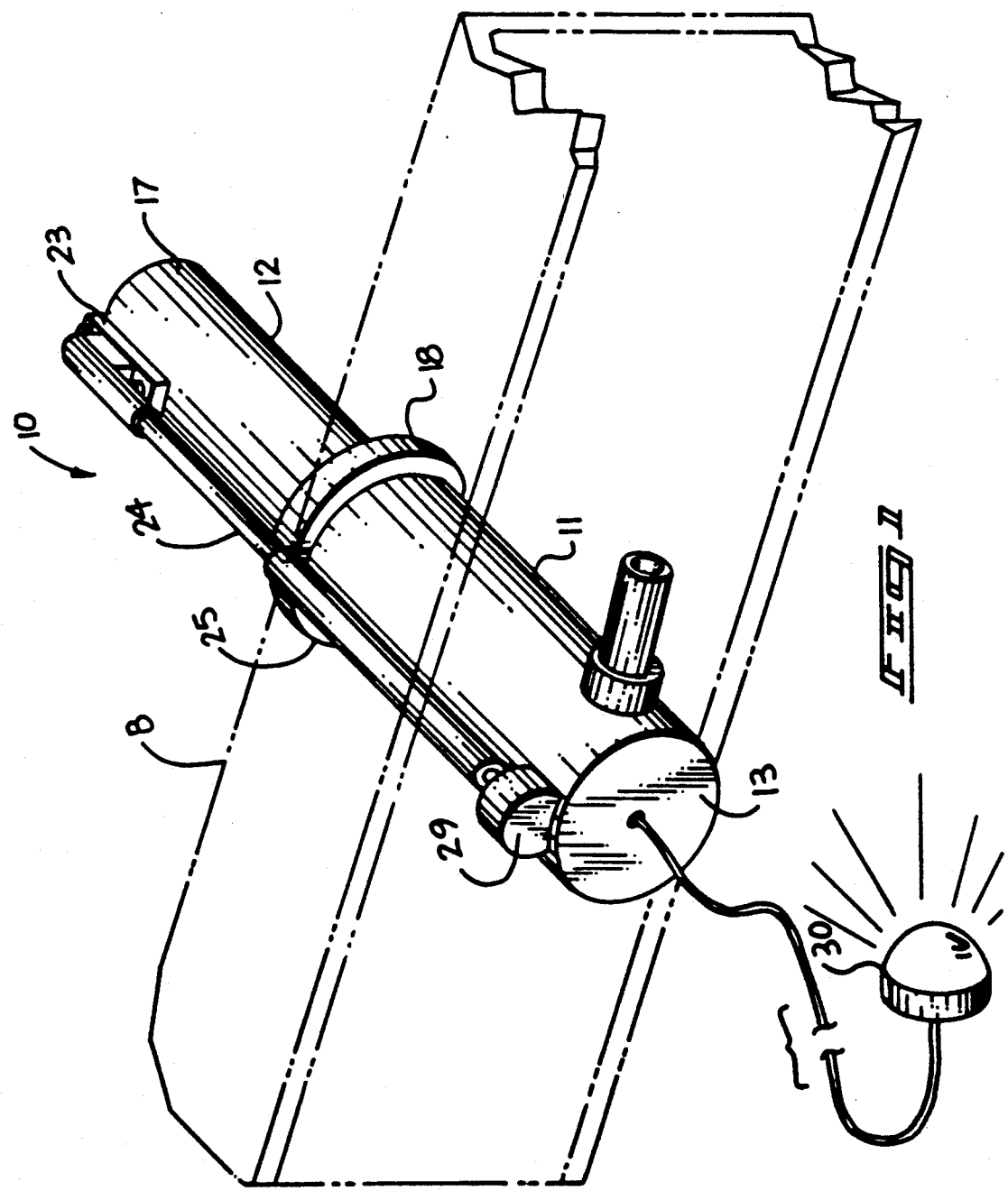

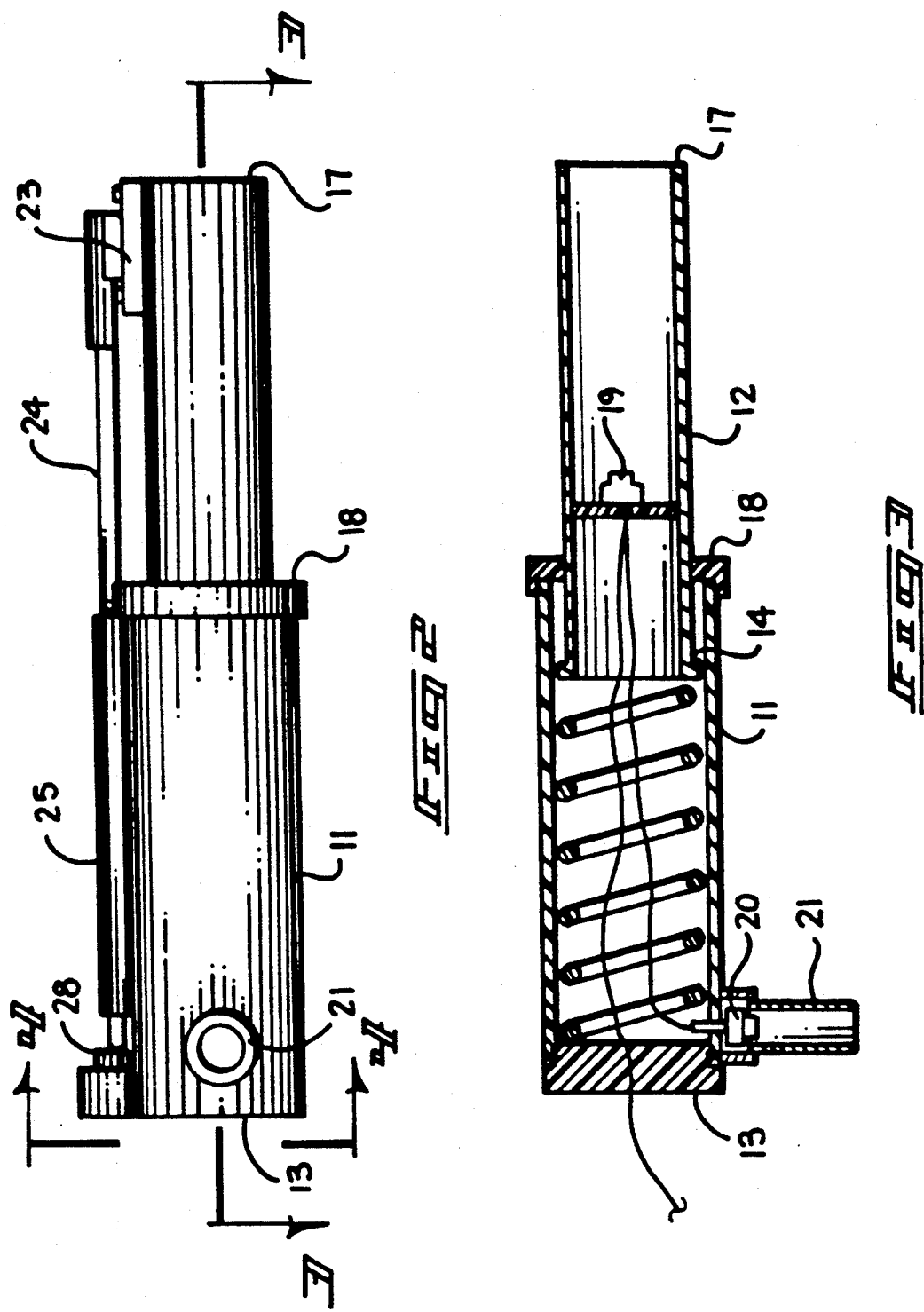

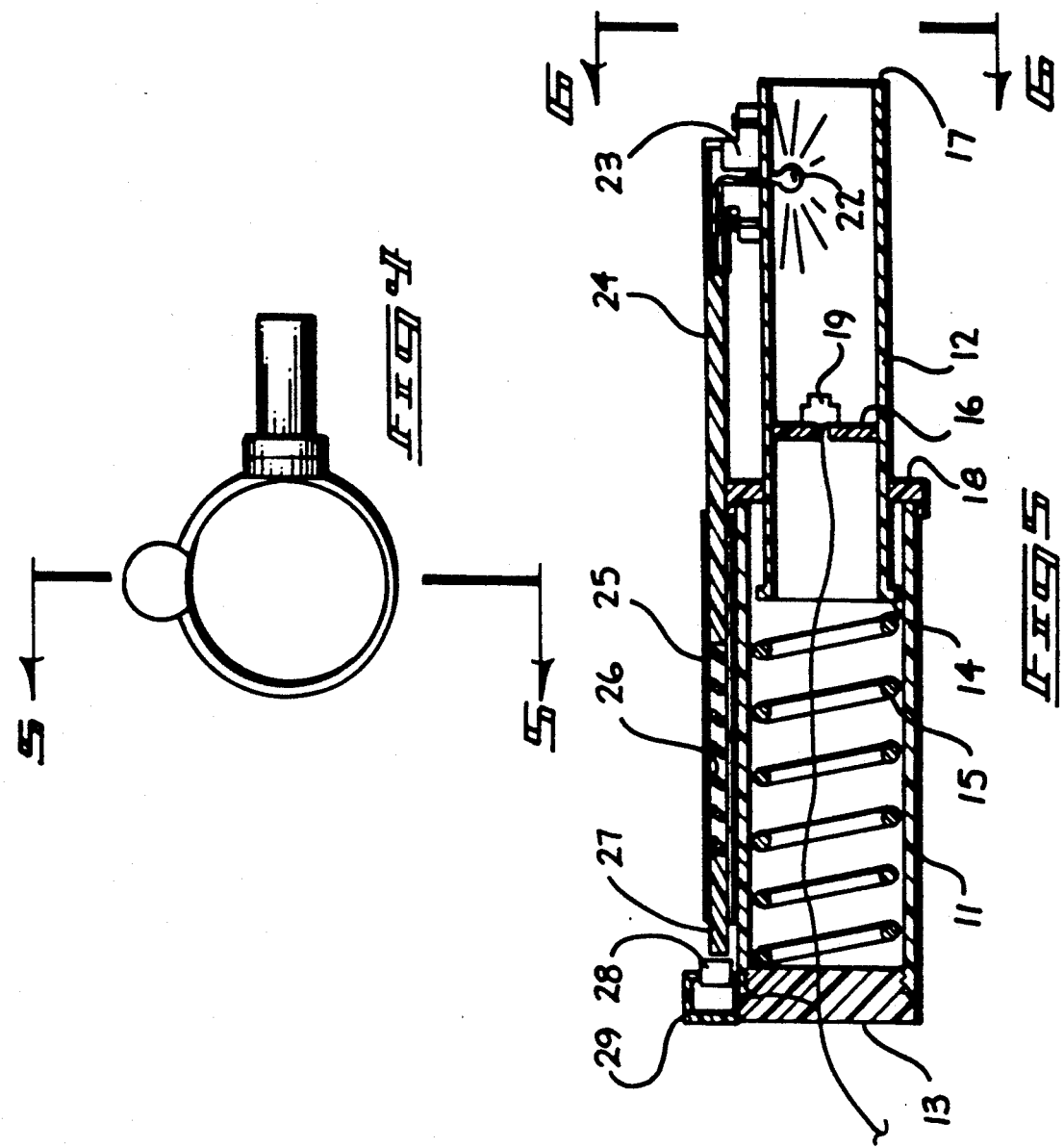

CONTACT ALARM APPARATUS

BACKGROUND OF THE INVENTION

1. Field of the Invention

The field of invention relates to impact alarm apparatus, and more particularly pertains to a new and improved contact alarm apparatus wherein the same is arranged to provide for visual indication of an object relative to a vehicle.

2. Description of the Prior Art

Various impact alarm structures have been presented in the prior art to provide for alarm relative to an associated vehicle. Such apparatus is exemplified in U.S. Pat. No. 4,967,180 to Wang wherein a pre-impact alarm structure is arranged to include a mechanical sensor.

U.S. Pat. No. 4,965,571 to Jones sets forth a further example of a mechanical sensor, as well as U.S. Pat. No. 3,089,455 to Aves.

U.S. Pat. No. 4,936,796 to Tendler sets forth an alarm organization relative to sonar type detection apparatus.

As such, it may be appreciated that there continues to be a need for a new and improved contact alarm apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of impact alarm apparatus now present in the prior art, the present invention provides a contact alarm apparatus wherein the same is arranged to provide for alert relative to an object presented proximate to an associated vehicle supporting the alarm apparatus. As such, the general purpose of the present invention, which will be described subsequently in greater detail, is to provide a new and improved contact alarm apparatus which has all the advantages of the prior art impact alarm apparatus and none of the disadvantages.

To attain this, the present invention provides a first cylinder orthogonally mounted relative to a vehicular bumper extending exteriorly thereof telescopingly receiving a second cylinder relative to the first cylinder in a coaxially aligned relationship, with the second cylinder extending beyond the first cylinder and arranged for retraction within the first cylinder. A first spring mounted between a rear terminal end of the second cylinder and the first cylinder maintains the second cylinder in an extended orientation. A first sensor mounted within the second cylinder sensitive to a lessening of light directed through the second cylinder is operative to engage an alarm light upon an object becoming in proximation to the forward distal end of the second cylinder. An alarm switch is mounted adjacent a rear terminal end of the first cylinder cooperative with an actuator rod mounted to the second cylinder to further provide actuation of the alarm light. The first light sensor is sensitive to light within a limited range, whereupon diminishing or additional reflected light effects closure of the switch to effect illumination of the alarm light. A second sensor is operative to effect illumination of a bulb within the second cylinder to effect illumination of the bulb during evening hours of lessened available light.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved contact alarm apparatus which has all the advantages of the prior art impact alarm apparatus and none of the disadvantages.

It is another object of the present invention to provide a new and improved contact alarm apparatus which may be easily and efficiently manufactured and marketed.

It is a further object of the present invention to provide a new and improved contact alarm apparatus which is of a durable and reliable construction.

An even further object of the present invention is to provide a new and improved contact alarm apparatus which is susceptible of a low cost of manufacture with regard to both materials and labor, and which accordingly is then susceptible of low prices of sale to the consuming public, thereby making such contact alarm apparatus economically available to the buying public.

Still yet another object of the present invention is to provide a new and improved contact alarm apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the invention mounted to a vehicular bumper.

FIG. 2 is an orthographic side view of the instant invention.

FIG. 3 is an orthographic view, taken along the lines 3—3 of FIG. 2 in the direction indicated by the arrows.

FIG. 4 is an orthographic view, taken along the lines 4—4 of FIG. 2 in the direction indicated by the arrows.

FIG. 5 is an orthographic view, taken along the lines 5—5 of FIG. 4 in the direction indicated by the arrows.

DESCRIPTION OF THE PREFERRED EMBODIMENT

Figure 6:
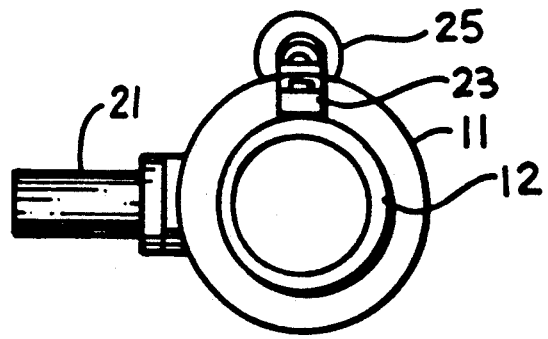
FIG. 6 is an orthographic view, taken along the lines 6—6 of FIG. 5 in the direction indicated by the arrows.
Figure 7:
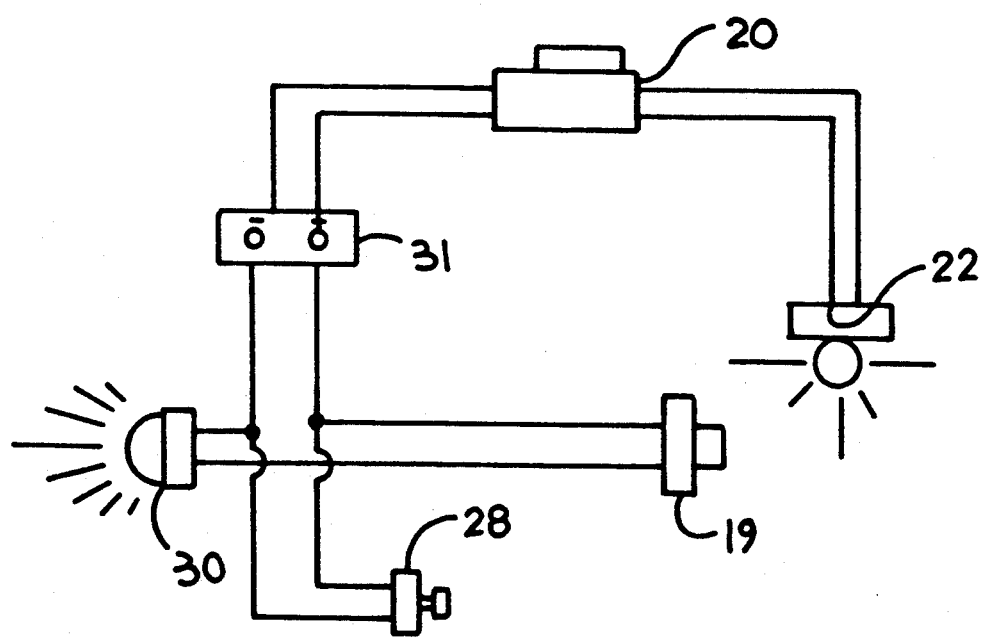
FIG. 7 is a diagrammatic illustration of electrical circuitry utilized by the invention.

With reference now to the drawings, and in particular to FIGS. 1 to 7 thereof, a new and improved contact alarm apparatus embodying the principles and concepts of the present invention and generally designated by the reference numeral 10 will be described.

More specifically, the contact alarm apparatus 10 of the instant invention essentially comprises a first cylinder 11 fixedly and orthogonally mounted relative to a vehicular bumper "B" to extend beyond the vehicular bumper "B", in a manner as illustrated in FIG. 1. The first cylinder 11 telescopingly receives a second cylinder 12 mounted coaxially relative to the first cylinder 11. The second cylinder 12 includes a second cylinder flange 14 mounted to the second cylinder rear distal end cooperative with the first spring captured between the second flange 14 and the first cylinder end wall 13 to bias the second cylinder in an extended orientation relative to the first cylinder. A second cylinder web 16 mounted within the second cylinder between the second cylinder flange 14 and the second cylinder forward distal end 17 includes a first light sensor 19 mounted thereon. The first light sensor 19 is arranged to effect closure upon variance of available light directed through the forward distal end 17 and the second cylinder relative to a predetermined illumination light range. Upon a vehicle or object presenting itself too closely relative to the second cylinder forward distal end 17, the first light sensor 19 closes to effect actuation of an associated alarm light member 30, in a manner as diagrammatically illustrated in the FIG. 7. Further, should the object effect contact with the second cylinder, projection of the second cylinder within the first cylinder 11 will effect actuation of a switch assembly 28. To this end, a rear plunger 27 proximate the switch assembly 28 positioned within a switch assembly housing 29 is projected to mechanically actuate the switch assembly 28 by communication therewith when a housing plunger rod 24 mounted to the second cylinder and slidably received within a plunger rod receiving housing 25 mounted to the first cylinder effects compression of a second spring 26 captured between the plunger rod 24 and the rear plunger 27. Compression of the second cylinder effects projection rearwardly of the rear plunger to thereby effect contact with the switch assembly 28.

Further, a second sensor 20 mounted to the first cylinder 11 within a chimney 21 to afford protection and light gathering ability of the second sensor 20 will upon lessening of available light such as in evening hours, effect actuation of an illumination bulb 22 mounted within an illumination bulb housing 23. The illumination bulb 22 is positioned within the second cylinder to provide for a constant source of available light relative to the first sensor 19 to generally maintain the first sensor in an opened position. Should an object present itself too closely, reflected light will thereafter increase or decrease beyond the predetermined range relative to the first sensor and effect actuation of the alarm light member 30.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A contact alarm apparatus fixedly mounted to a vehicular bumper, including a first cylinder mounted to the vehicular bumper and extending beyond the vehicular bumper, with a second cylinder telescopingly received with and coaxially aligned relative to the first cylinder, the first cylinder includes a first cylinder end wall spaced from the second cylinder, and the second cylinder includes a second cylinder rear distal end and a second cylinder forward distal end, a second cylinder flange is mounted to the rear distal end, and includes a first spring captured between the second flange and the first cylinder end wall to maintain the second cylinder in the projected orientation relative to the first cylinder, and the second cylinder including a first light sensor mounted within the second cylinder operative to detect available light within a predetermined light range and in electrical communication with an alarm light member to effect actuation of the alarm light member upon variance of said available light from the predetermined light range, and a second sensor mounted to the first cylinder adjacent the first cylinder end wall, the second sensor including a chimney positioned in surrounding relationship relative to the second sensor and extending beyond the second sensor, where the chimney is obliquely oriented relative to the first cylinder and the second cylinder, and an illumination bulb housing mounted adjacent the forward distal end of the second cylinder, with an illumination bulb mounted within the housing, and the illumination bulb projecting into the second cylinder, wherein the second light sensor is arranged for actuation of the illumination bulb upon lessening of available light directed into the chimney.

* * * * *